O. A. DANIELSON.
TELEGRAPH SYSTEM.
APPLICATION FILED MAY 2, 1917.
1,262,648.
Patented Apr. 16, 1918.
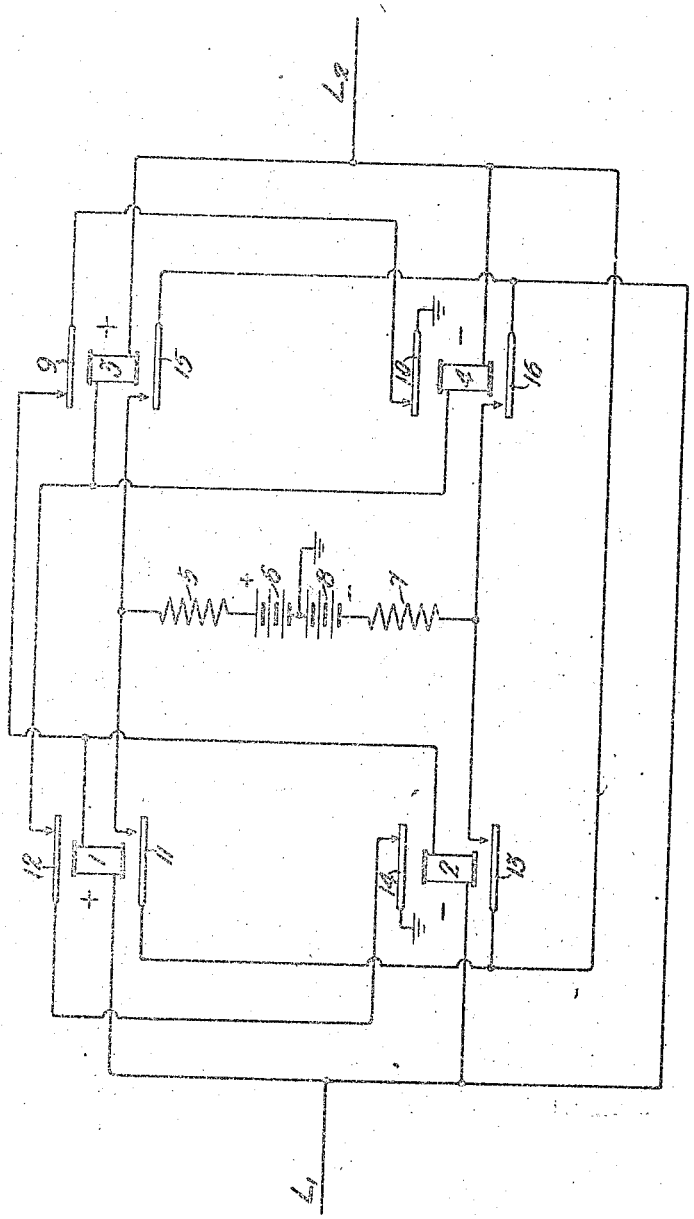
Inventor:
Oscar A. Danielson.
by J. E. Roberts
Atty.

UNITED STATES PATENT OFFICE.

OSCAR A. DANIELSON, OF PLAINFIELD, NEW JERSEY, ASSIGNOR TO WESTERN ELECTRIC COMPANY, INCORPORATED, OF NEW YORK, N. Y., A CORPORATION OF NEW YORK.

TELEGRAPH SYSTEM.

1,262,648.  Specification of Letters Patent.  Patented Apr. 16, 1918.

Application filed May 2, 1917. Serial No. 165,822.

*To all whom it may concern:*

Be it known that I, OSCAR A. DANIELSON, a citizen of the United States, residing at Plainfield, in the county of Union and State of New Jersey, have invented certain new and useful Improvements in Telegraph Systems, of which the following is a full, clear, concise, and exact description.

This invention relates to telegraph systems and more particularly to improvements in systems for the repeating of telegraph signals or electrical impulses from one line circuit section into another line circuit section, these repeating operations taking place automatically and in either direction. On long telegraph lines the resistance of the line and the leakage, due to low insulation resistance, often limit the length of line that can be served efficiently by a single E. M. F., and it, therefore, becomes advisable to divide the total length of line into separate sections, using separate batteries for different sections and repeating the messages automatically from one section to another.

It is the object of the present invention to provide a simplified and an efficient arrangement of apparatus, suitable for repeating telegraphic signals or electrical impulses automatically from one section to another and operable in either direction. A further object is to provide apparatus which is not only economical because of the low cost of manufacture, but also apparatus, the maintenance of which is not high and does not require expert service. To accomplish these results the equipment provided comprises four relays of uniform standard type equipped with front and back contact springs, two of these relays being arranged to respond only to impulses of positive polarity, while the other two relays respond only to impulses of negative polarity. Associated with the front contacts of these relays are two grounded batteries of opposite polarity, so arranged in the circuit as to make it possible to send out on one section of the line a strong impulse identical in character with the impulse received from the other section of the line.

The object of this invention may be more clearly understood by reference to the accompanying drawing which shows diagrammatically the arrangement of apparatus proposed for repeating signals between the line sections $L^1$ and $L^2$. The relays used in this equipment are preferably of the standard polarized type adapted to respond to current impulses of one polarity only. Relays 1 and 3 are adapted to respond only to impulses of positive polarity, while relays 2 and 4 respond only to impulses of negative polarity. The line $L^1$ is connected through the windings of relays 1 and 2, which are joined in parallel, and thence to ground through the back contacts of relays 3 and 4. In a corresponding manner the line $L^2$ is connected to the windings of relays 3 and 4 in parallel and thence to ground through the back contacts of relays 1 and 2. The front contacts of relays 1 and 3, which respond to positive pulsations, are connected through a protective resistance 5 to the positive terminal of the repeater battery 6, the negative terminal of this battery being connected to ground. Simultaneously, the front contacts of relays 2 and 4, which respond only to negative pulsations, are connected through the protective resistance 7 to the negative terminal of the battery 8, the positive terminal of this battery being grounded.

To more clearly understand the operation of the apparatus, let it be assumed that telegraphic signals are being sent over line $L^1$ and it is desired that they be repeated over the line $L^2$. These current impulses pass through the windings of relays 1 and 2 in parallel, and thence to ground through the back contact and armature 9 of relay 3 and the back contact and armature 10 of relay 4. If this current pulsation is of positive polarity relay 2 remains unoperated but relay 1 operates, and in so doing connects the repeater battery 6, which is of the same polarity as the energizing pulsation, through the front contact and armature 11 of relay 1 to the line section $L^2$. As the relay 1 operates the circuit through its back contact and armature 12 is opened, thereby eliminating any possibility of confusing impulses being received over the line $L^2$ through the back contacts of relays 1 and 2 to ground. This relay is adjusted so that the circuit through armature 12 and its contact is opened before, or simultaneously with, the closing of the circuit through armature 11 and its contact in order not to provide a momentary path to ground for the repeater battery through the back contacts of this relay. Assuming that the pulsation over line section $L^1$ is negative in character, relay 1 then remains unoperated while relay 2 functions, connecting the repeater battery 7 of the same polarity as the energizing pulsation to the line section $L^2$ through the front contact and armature 13 of the relay 2. The operation of this relay opens the circuit from line $L^2$ to ground by the movement of armature 14 away from its contact.

The operation of this apparatus in response to current pulsations entering on line $L^2$ is identical with that just described for pulsations entering over line $L^1$. The current pulsations pass through the windings of relays 3 and 4 in parallel and thence to ground through the back contact and armature 12 of relay 1 and the back contact and armature 14 of relay 2. A pulsation of positive polarity causes only relay 3 to operate, thereby breaking the circuit from $L^1$ to ground by the movement of armature 9 away from its back contact and connecting the repeater battery 6 of positive polarity to $L^1$ through the front contact and armature 15. Similarly, in response to a negative pulsation entering over line $L^2$ only relay 4 operates. The operation of this relay breaks the connection between line $L^1$ and ground by the opening of the circuit at the back contact and armature 10 and connects the repeater battery 8 to $L^1$ through the front contact and armature 16 of relay 4.

From the foregoing it will be noted that the proposed arrangement of apparatus affords a very simple and efficient arrangement for the automatic repeating of current impulses from one section of line into another, and in either direction. While the system illustrated and described is arranged for the repeating of current impulses in either direction, it is, of course obvious that where only a one-way repeater is desired a similar arrangement could be used, eliminating the two relays shown in the line section over which the repeated signals are to be sent.

What is claimed is:

1. In a telegraph repeater system, a plurality of lines, two inversely responsive relays for each line, means controlled by each relay of each line to disable the other line, and means controlled by each relay of each line to repeat signals from the respectively associated line into the other line.

2. In a signaling system, sources of current, a plurality of line sections and a pair of relays for each one of said line sections for repeating current impulses into another one of said line sections, the relays in each of said sections being under the control of either one of the relays in said other section.

3. In a signaling system, a plurality of line sections, a pair of relays for each of said line sections for repeating current impulses into the other line section, the relays in each of said sections being under the control of relays in another section, one of said relays in each section being responsive only to current impulses of positive polarity, the other of said relays in each section being responsive only to current impulses of negative polarity, a source of current of positive polarity controlled by said relays responsive to positive current impulses, and a source of current of negative polarity controlled by said relays responsive to negative current impulses.

4. In a signaling system, a line circuit divided into sections, sources of current of opposite polarity, and electromagnetic devices associated with each section and selectively responsive to the current impulses of different polarity over that section to select and connect with another section the source of current having a polarity corresponding to that of the selecting impulse, said electromagnetic devices in each of said sections being under the control of the electromagnetic devices in another section.

5. In a telegraph system of the class wherein signals are transmitted by means of currents having different characteristics, a first and second line section, two relays inversely responsive to said signaling currents for each of said lines, and means controlled by inverse operation of the two relays of each line for reciprocally acting to disable the other line and to repeat signals thereinto.

In witness whereof, I hereunto subscribe my name this 26th day of April, A. D. 1917.

OSCAR A. DANIELSON.